United States Patent
Zhou

(10) Patent No.: US 10,931,926 B2
(45) Date of Patent: Feb. 23, 2021

(54) METHOD AND APPARATUS FOR INFORMATION DISPLAY, AND DISPLAY DEVICE

(71) Applicant: Beijing Xiaomi Mobile Software Co., Ltd., Beijing (CN)

(72) Inventor: Liang Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/677,973

(22) Filed: Nov. 8, 2019

(65) Prior Publication Data
US 2020/0154085 A1 May 14, 2020

(30) Foreign Application Priority Data
Nov. 9, 2018 (CN) .......................... 201811331018.4

(51) Int. Cl.
H04N 9/31 (2006.01)
G06T 7/70 (2017.01)
G02B 27/01 (2006.01)

(52) U.S. Cl.
CPC ....... *H04N 9/3185* (2013.01); *G02B 27/0172* (2013.01); *G06T 7/70* (2017.01); *H04N 9/3188* (2013.01); *G02B 2027/0178* (2013.01); *G06T 2207/30244* (2013.01)

(58) Field of Classification Search
CPC ............... H04N 9/3188; H04N 9/3185; G02B 27/0172; G02B 2027/0178; G09G 2320/0261; G09G 3/20; G09G 2340/14; G09G 2354/00; G09G 2340/0464; G06T 2207/30244; G06T 7/70; G06F 2203/012; G06F 3/147; G06F 3/011; G06K 9/00671
See application file for complete search history.

(56) References Cited

U.S. PATENT DOCUMENTS

| | | | |
|---|---|---|---|
| 10,567,641 B1 * | 2/2020 | Rueckner | H04N 5/2257 |
| 2013/0321255 A1 | 12/2013 | Lamb et al. | |
| 2016/0210784 A1 * | 7/2016 | Ramsby | G02B 27/0176 |
| 2019/0025588 A1 * | 1/2019 | Osterhout | H04N 13/296 |
| 2019/0130622 A1 * | 5/2019 | Hoover | G06T 11/60 |

FOREIGN PATENT DOCUMENTS

| | | |
|---|---|---|
| CN | 102446048 A | 5/2012 |
| CN | 105426035 A | 3/2016 |
| CN | 107615227 A | 1/2018 |
| EP | 2 657 929 A2 | 10/2013 |
| EP | 2 757 549 A1 | 7/2014 |

OTHER PUBLICATIONS

Extended European Search Report for Application No. 19208069.5, dated Mar. 24, 2020.

\* cited by examiner

*Primary Examiner* — Muhammad N Edun
(74) *Attorney, Agent, or Firm* — Finnegan, Henderson, Farabow, Garrett & Dunner, L.L.P.

(57) ABSTRACT

A method for information display, applied to a see-through near-eye display device, includes: obtaining association information corresponding to a display object; determining a target display area of the display object within a visual field of the see-through near-eye display device; and displaying the association information in a second area within the visual field excluding the target display area, the second area having no display content.

9 Claims, 8 Drawing Sheets

METHOD AND APPARATUS FOR INFORMATION DISPLAY, AND DISPLAY DEVICE

CROSS-REFERENCE TO RELATED APPLICATION

This application is based upon and claims priority to Chinese Patent Application No. 201811331018.4, filed on Nov. 9, 2018, the entire contents of which are incorporated herein by reference.

TECHNICAL FIELD

The present disclosure relates to the field of information display technologies, and more particularly, to a method and an apparatus for information display, and a display device.

BACKGROUND

With the development of information technology, augmented reality (AR)/mixed reality (MR) display glasses may become the next mobile platform, and existing AR/MR devices have already shown the potential of this platform. Its capabilities of spatial positioning, Simultaneously Location and Mapping (SLAM), and digital light field display can bring a new visual interaction experience, such as holographic model sharing, reproduction and the like, between multiple users.

However, new user experience also faces many technical challenges, for example, how to correctly display the received shared content and related information thereof in a very limited display field of view (FOV) of the AR/MR devices.

SUMMARY

According to a first aspect of the embodiments of the present disclosure, there is provided a method for information display. The method is applied to a see-through near-eye display device and includes: obtaining association information corresponding to a display object; determining a target display area of the display object within a visual field of the see-through near-eye display device; and displaying the association information in a second area within the visual field excluding the target display area, the second area having no display content.

According to a second aspect of the embodiments of the present disclosure, there is provided a display device, including: a processor; and a memory for storing instructions executable by the processor; wherein the processor is configured to: obtain association information corresponding to a display object; determine a target display area of the display object within a visual field of the see-through near-eye display device; and display the association information in a second area within the visual field excluding the target display area, the second area having no display content.

According to a third aspect of the embodiments of the present disclosure, there is provided a non-transitory computer-readable storage medium having stored thereon instructions that, when executed by a processor of a see-through near-eye display device, cause the see-through near-eye display device to perform a method for information display. The method includes: obtaining association information corresponding to a display object; determining a target display area of the display object within a visual field of the see-through near-eye display device; and displaying the association information in a second area within the visual field excluding the target display area, the second area having no display content.

The technical solution provided by the embodiments of the present disclosure may include the following beneficial effects.

In the embodiments, according to the target display area of the display object within the visual field of device, the see-through near-eye display device determines that a display position of the association information for the display object as another area, which has no display content, within the visual field excluding the target display area, enabling both the display object and the associated information thereof to desirably match display capability of the device within a limited visual field for normal display, thereby improving the display capability of the device.

It should be understood that the above general description and the detailed description below are merely exemplary and explanatory, and do not limit the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the present disclosure are for the purpose of describing particular embodiments only, and are not intended to limit the disclosure. The singular forms 'one', 'the' and 'that' used in the present disclosure and the appended claims are also intended to include the plural forms unless the context clearly indicates otherwise. It should also be understood that the term 'and/or' as used herein refers to and includes any and all possible combinations of one or more related listed items.

It should be understood that although the terms first, second, third, etc. may be used in the present disclosure to describe various information, such information should not be limited to these terms. These terms are only used to distinguish the same type of information from each other. For example, the first information may also be referred to as second information without departing from the scope of the present disclosure. Similarly, the second information may also be referred to as the first information. Depending on the context, the word 'if' as used herein may be interpreted as 'when' or 'while' or 'in response to determination'.

Figure 1:
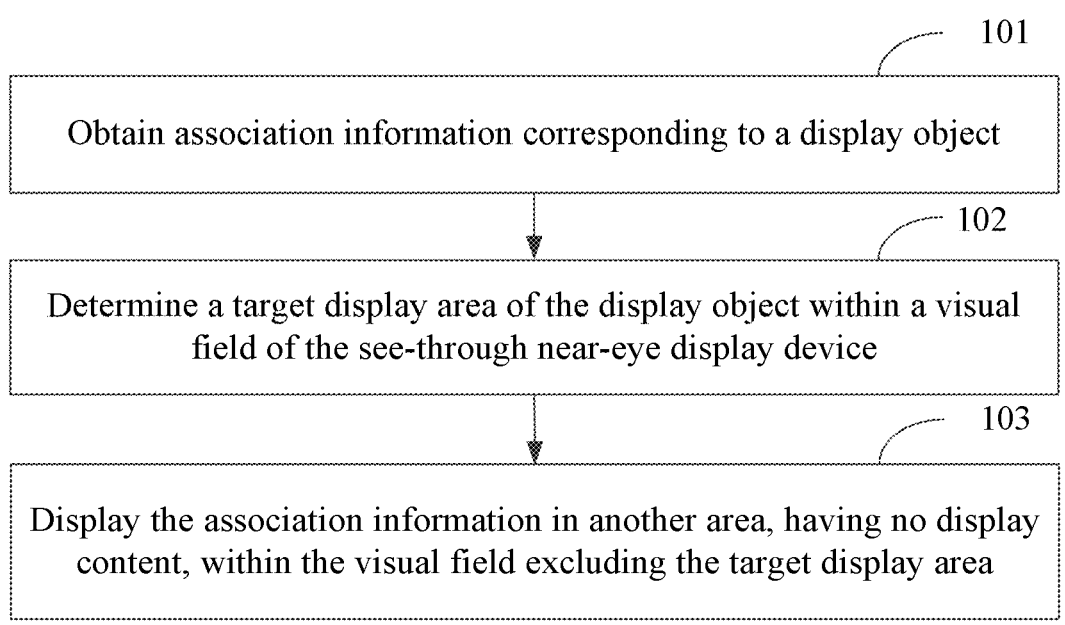
FIG. 1 is a flow chart of a method for information display according to an exemplary embodiment.

FIG. 1 is a flow chart of a method for information display according to an exemplary embodiment of the present disclosure. The method may be applied to a see-through near-eye display device. For example, the see-through near-eye display device may include, but is not limited to, an augmented reality (AR) device, a mixed reality (MR) device, and the like. Referring to FIG. 1, the method may include the following steps 101-103.

In step 101, association information corresponding to a display object is obtained.

In an embodiment, the display object may be virtual display content associated with a current geographic location where the see-through near-eye display device is located. For example, the display object may include shared content of the current geographic location. The see-through near-eye display device may receive the shared content related to the current geographic location through a wireless network.

The association information corresponding to the display object may include content predetermined for the display object, and for example, different association information may be predetermined according to different display objects. The associated information may be represented in the form of text, pictures, video, animation, models, and the like.

As an example, the association information may include text description information, user comments, product prices, voice description information, and the like related to the display object.

In an embodiment, the association information corresponding to the display object is obtained by scanning a two-dimensional code image corresponding to the display object, or from meta information attached to the display object.

In one embodiment, the two-dimensional code image may be generated for association information of different display objects, and the two-dimensional code image is added to the display object. When the see-through near-eye display device displays the display object, the two-dimensional code image may be scanned by an image capturing apparatus of the see-through near-eye display device, and the association information in the two-dimensional code image may be obtained by an image recognition technology.

In another embodiment, the association information of the display object may be attached to the display object as the meta information (also referred to as metadata) of the display object, and when the display object is displayed by the see-through near-eye display device, the association information in the two-dimensional code image may be obtained from the meta information. In the embodiment, the meta information is information used for describing data, and may include information describing an element or attribute (name, size, data type, etc.) of data, or its structure (length, field, data column), or its related data (where it is located, how to contact, owner).

The present disclosure is not limited to the above two ways of obtaining the association information, and those skilled in the art may use other methods to obtain the association information of the display object.

In step 102, a target display area of the display object within a visual field of the see-through near-eye display device is determined.

In an embodiment, the visual field of the see-through near-eye display device may be a spatial range that can be displayed by the see-through near-eye display device.

In an embodiment, step 102 may further include the following sub-steps S11-S14.

In sub-step S11, a map of environment, in which the see-through near-eye display device is located, is constructed.

As an example, the map may include, but is not limited to, one of the following maps: a feature point map, a grid map, a topological map, a point cloud map, and the like.

In an embodiment, a mapping method of Simultaneous Localization and Mapping (SLAM) algorithm can be used to construct the map of the environment in which the see-through near-eye display device is located.

A mapping method in the SLAM may include the following steps, but it should be understood that the embodiment is not limited to the following mapping method, and those skilled in the art may use other mapping methods to construct the map.

Firstly, original point clouds of the current environment are obtained through a depth sensor (such as a binocular camera, structured light, Time of Flight (TOF), etc.) in the see-through near-eye display device.

Then, the original point clouds in different perspectives are stitched together to obtain a complete point cloud of the current scene. In one embodiment, stitching of the point clouds can be implemented by a manner of Iterative Closest Point (ICP) or motion tracking assistance.

Finally, processing, such as point cloud processing, grid generation and the like, is performed to the complete point cloud of the current scene. In an embodiment, the processing, such as point cloud processing, grid generation and the like, may include, but is not limited to, the following processing methods: octree map (OctoMap) reconstruction method, Truncated Signed Distance Function (TSDF) reconstruction, Poisson (location) reconstruction and the like.

In sub-step S12, pose information of the see-through near-eye display device and the display object on the map are obtained respectively.

In an embodiment, the pose information represents position and posture of the see-through near-eye display device or the display object in the space. As an example, the pose information may include a six-degree-of-freedom (6DOF) pose of the see-through near-eye device or the display object, wherein the six-degree-of-freedom pose may be position information (x, y, z) of freedom degrees of movement along three orthogonal coordinate axes of x, y, and z, and angular information (pitch, yaw, roll) of freedom degrees of rotation around the three coordinate axes.

In one embodiment, the positioning method of the SLAM algorithm (such as a motion tracking) can be used to perform motion tracking on the device or display object to determine the pose information of the see-through near-eye display device or the display object on the reconstructed map.

One of the motion tracking methods may include the following models: tracking with motion model, tracking with reference key frame, and relocalization.

The tracking with motion model may be implemented as follows. Assuming that the device or the display object (the device or the display object may be collectively referred to as a target) is moved at a constant speed, the pose and velocity of the previous frame can be used to estimate the pose of the current frame. The speed of the previous frame can be calculated from the pose of preceding frames. This model is suitable for situations where the speed and direction of motion are relatively uniform without large rotations. For the targets with more random movement, the following two models may be used.

The tracking with reference key frame may be implemented as follows. If the tracking with motion model has failed, the nearest keyframe may be matched firstly, since the distance between the current frame and the previous keyframe is not very far. In implementation, BoW (Bag of Words Model) can be used to speed up matching. In an embodiment, the BoW of the current frame can be calculated firstly, and the initial pose is set to the pose of the previous frame; secondly, feature matching is sought based on the pose and BoW dictionary; finally, the matched features are used to optimize the pose.

The relocalization may be implemented as follows. If the matching between the current frame and the nearest neighbor keyframe also fails, it means that the current frame has been lost and the real position may not be determined. Accordingly, all keyframes may be matched to determine whether the right position can be found. Firstly, the Bow vector of the current frame is calculated. Secondly, several keyframes are selected based on the BoW dictionary as alternatives. Then, keyframes with enough matched feature points are determined. Finally, feature point matching is used to iteratively solve poses. If there are enough interior points for the keyframe, the optimized pose of the keyframe is selected.

In sub-step S13, the visual field of the see-through near-eye display device is determined according to a field angle of the see-through near-eye display device and pose information of the see-through near-eye display device.

In an embodiment, according to the field angle (also referred to as FOV, Field of View) of the see-through near-eye display device and its pose information on the map, the display range in a three-dimensional space, that is, the visual field of the see-through near-eye display device, can be determined.

Figure 2:
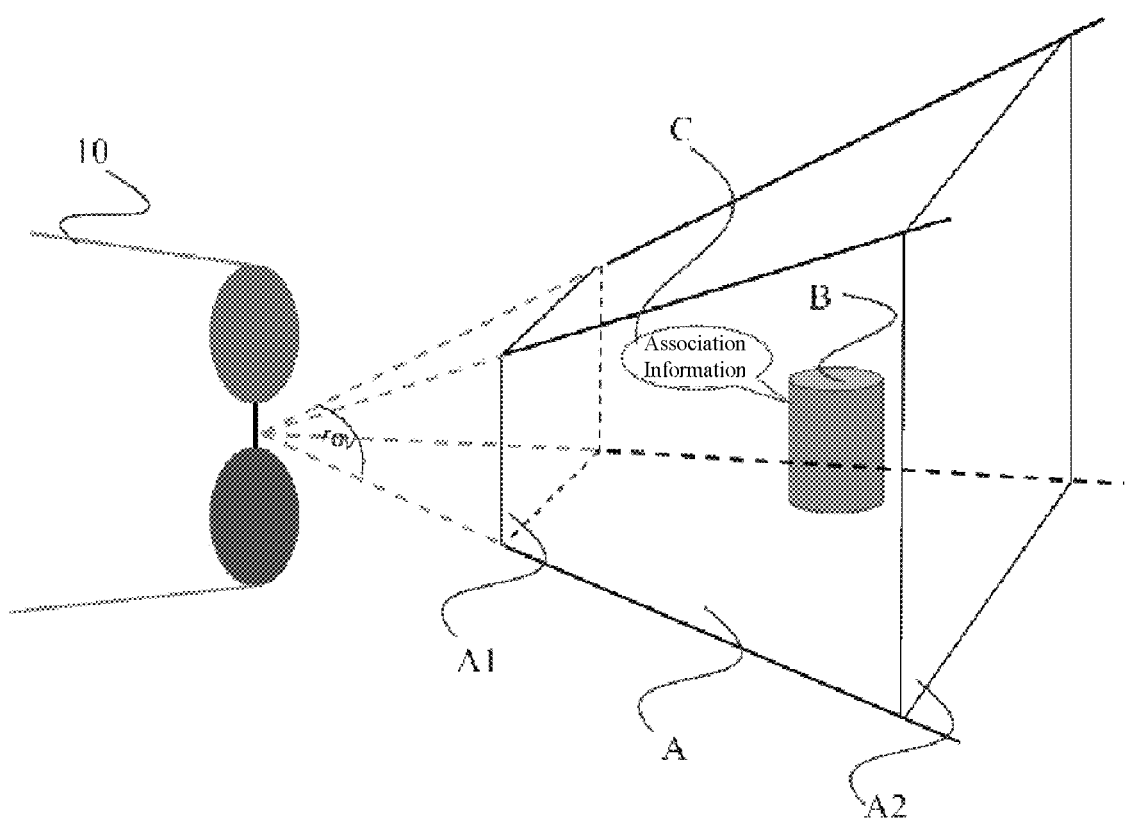
FIG. 2 is a schematic diagram illustrating display of a device according to an exemplary embodiment.

For example, referring to the device display diagram of FIG. 2, the visual field of a see-through near-eye display device 10 is an area A, and the area A is the three-dimensional space area between a far plane A2 and a near plane A1. The position of each of the near plane A1 and the far plane A2 in the space may be determined by the pose information of the see-through near-eye display device 10. The plane size of each of the near plane A1 and the far plane A2 in the space may be determined by the field angle of the see-through near-eye display device 10. In sub-step S14, according to the pose information of the display object, an overlapping area of the display object within the visual field is determined as the target display area of the display object within the visual field of the see-through near-eye display device.

According to the pose information of the display object, the three-dimensional space range corresponding to the display object may be determined, and then the overlapping area of the three-dimensional space range and the visual field of the see-through near-eye display device is obtained as the target display area of the display object within the visual field.

For example, as shown in FIG. 2, according to the pose information of the display object, it can be determined that the target display area of the display object within the visual field is an area B.

Referring back to FIG. 1, in step 103, the association information is displayed in another area (i.e., a second area), having no display content, within the visual field excluding the target display area.

After it is determined that the display object is in the target display area within the visual field, the association information may be displayed in another area having no display content within the visual field excluding the target display area. In an embodiment, step 103 may further include the following sub-steps S21-S22.

In sub-step S21, a display attribute of the association information is determined, the display attribute including a display area size required for the association information.

The display attribute of the associated information may be predetermined, or may also be customized by the user prior to display, which is not limited in the embodiment.

As an example, the display attribute of the association information may include, but not be limited to: display area size required for the association information, display color and display brightness of the associated information, and the like.

In sub-step S22, it is selected, from areas of the visual field excluding the target display area, the another area fitting the display area size required for the association information to display the association information.

In an embodiment, the area fitting the display area size required for the association information may include an area with a size greater than or equal to the size of the display area.

In an embodiment, if the see-through near-eye display device has the ability to reconstruct the geometric information of the plane in the scene, occlusion relationship of the geometric information may be considered in the determination of the display area of the association information, that is, the selected area for displaying the association information may be an area without occlusion.

For example, in FIG. 2, after the visual field A of the see-through near-eye display device 10 and the target display area B of the display object are determined, the association information may be displayed in an area within the visual field A excluding the target display area B, such as the area C.

Figure 3:
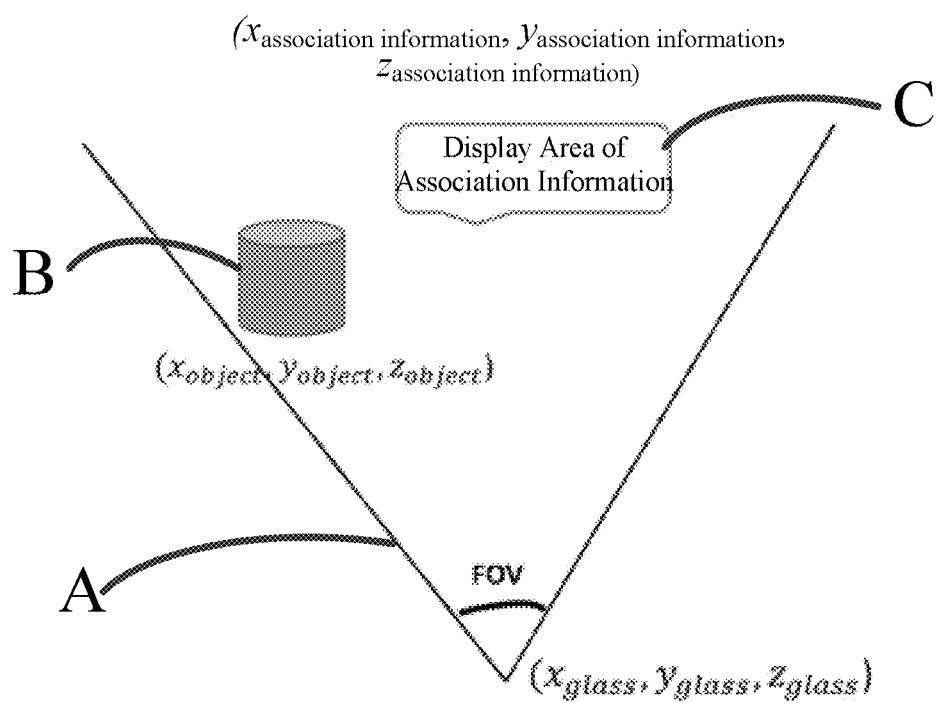
FIG. 3 is a schematic diagram illustrating two-dimensional display of a device according to an exemplary embodiment.

For another example, as shown in the two-dimensional display schematic diagram of the device in FIG. 3, in the two-dimensional display schematic diagram, the three freedom degrees of the see-through near-eye display device (assumed to be AR/MR glasses) is $(x_{glass}, y_{glass}, z_{glass})$. According to $(x_{glass}, y_{glass}, z_{glass})$ and the FOV of the device, the visual field A of the device may be determined. According to the obtained three degrees of freedom $(x_{object}, y_{object}, z_{object})$ of the display object, it may be determined that the display object is displayed in the area B, and the association information may be displayed on the right side of the visual field A. For example, according to the display area having no display content within the visual field A, the three freedom degrees of the association information may be determined as ($x_{association\ information}$, $y_{association\ information}$, $z_{association\ information}$), thereby determining that the display area of the association information is the area C.

In one embodiment, when the association information is displayed, the characteristics of the background area may also be optimized according to display attributes, such as display color, display brightness, etc., of the association information. The characteristics of background area may include, but not limited to, background color, texture, brightness, distance, and the like. For example, when the association information is black text, the background color can be set to a light background to enhance the text display contrast.

In the embodiment, according to the received target display area of the target object within the visual field of the device, the see-through near-eye display device determines that a display position of the association information for the display object as another area, which has no display content, within the visual field excluding the target display area, enabling both the display object and the associated information thereof to desirably match display capability of the device within a limited visual field for normal display, thereby improving the display capability of the device.

In an embodiment, the method may further include the following step.

When a pose of the see-through near-eye display device and/or the display object on the map is changed, the target display area of the display object within the visual field of the see-through near-eye display device is updated, and a display area of the association information is re-determined based on the updated target display area.

Figure 4:
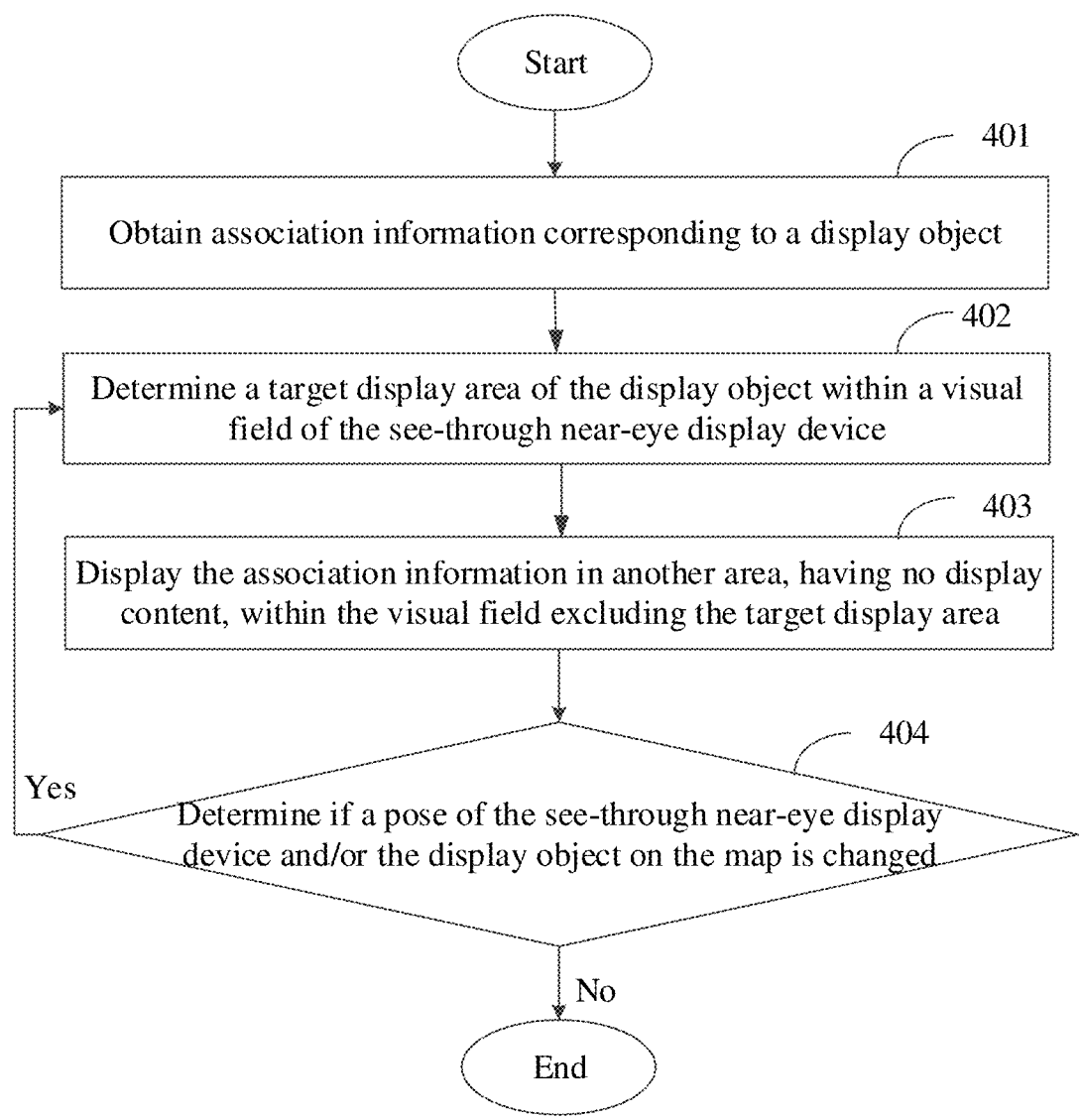
FIG. 4 is a flow chart of a method for information display according to another exemplary embodiment.

In an embodiment, based on the above pose change of scene, FIG. 4 is a flow chart of a method for information display according to another exemplary embodiment of the present disclosure, including the following steps 401-404.

In step 401, association information corresponding to a display object is obtained.

In step 402, a target display area of the display object within a visual field of the see-through near-eye display device is determined.

In step 403, the association information is displayed in another area, having no display content, within the visual field excluding the target display area.

In step 404, it is determined whether the pose of the see-through near-eye display device and/or the display object is changed on the map. If yes, the process returns to step 402 and step 403; if not, the process ends.

In an embodiment, the pose information of the see-through near-eye display device and/or the display object may be obtained by the SLAM algorithm timing (for example, detecting 1000 poses in 1 second), and the pose information is compared with the pose information obtained in the previous cycle to determine whether the pose of the see-through near-eye display device and/or the display object is changed according to the pose information.

In an embodiment, when the user moves the see-through near-eye display device, a pose change of the see-through near-eye display device may be caused. When the user interacts with the display object, for example, the user drags the display object through a handle or gesture interaction, such as dragging the display object from the right side of the FOV to the left side of the FOV, the pose change of the display object is caused.

When the pose change of the see-through near-eye display device and/or the display object is detected, step 402 may be returned to re-determine the target display area of the display object within the visual field of the see-through near-eye display device, and then step 403 is performed to determine the display area of the association information based on the re-determined target display area.

Figure 5:
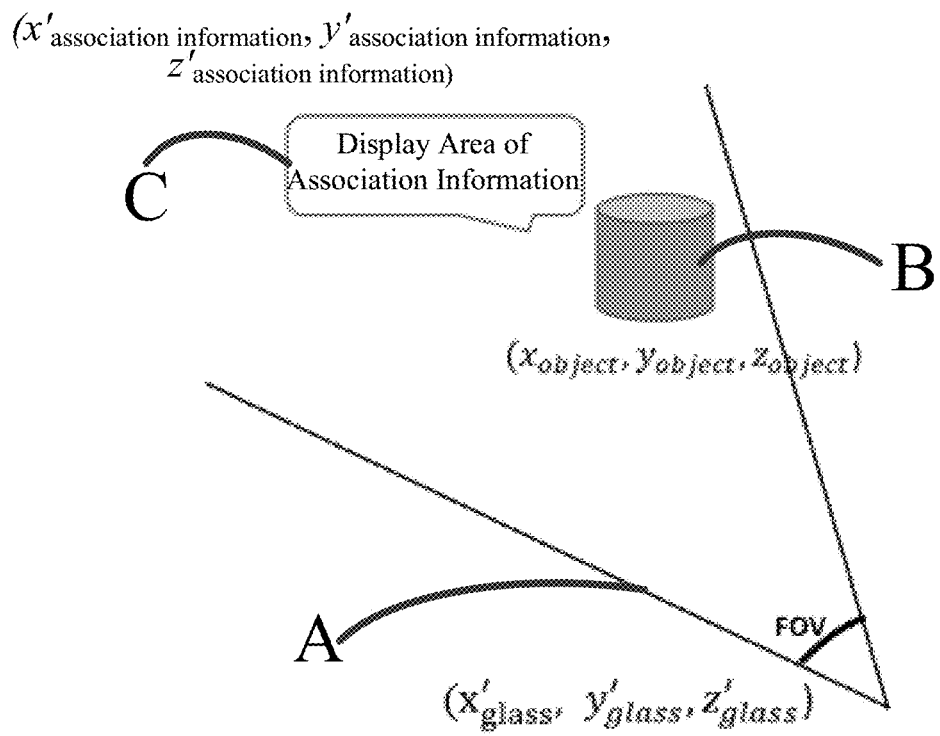
FIG. 5 and FIG. 6 are schematic diagrams illustrating two-dimensional display of a device according to an exemplary embodiment.
Figure 6:
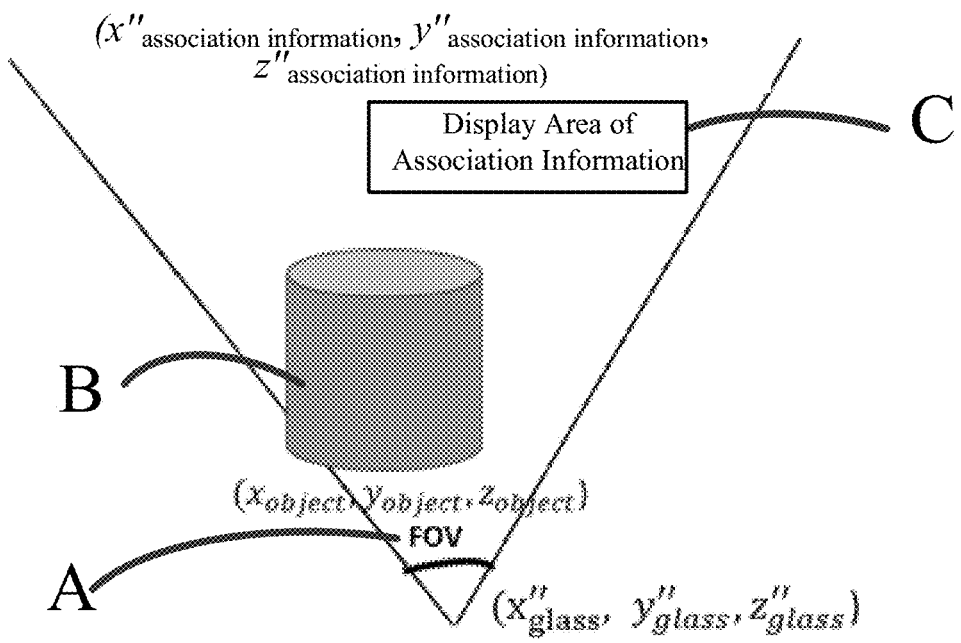

For example, taking the pose in FIG. 3 as the original pose of the device and the display object, FIG. 5 and FIG. 6 show the change of spatial display position of association information caused by the change of relative position (orientation, distance) of the device and the display object.

In this embodiment, the display position of the association information can be adaptively updated according to the pose change of the device and/or the display object, so that the display of the association information is always adapted to the display capability of the device, thereby improving the display capability of the device.

Corresponding to the embodiments of the method for information display described above, the present disclosure also provides embodiments of an apparatus for information display and a display device to which it is applied.

Figure 7:
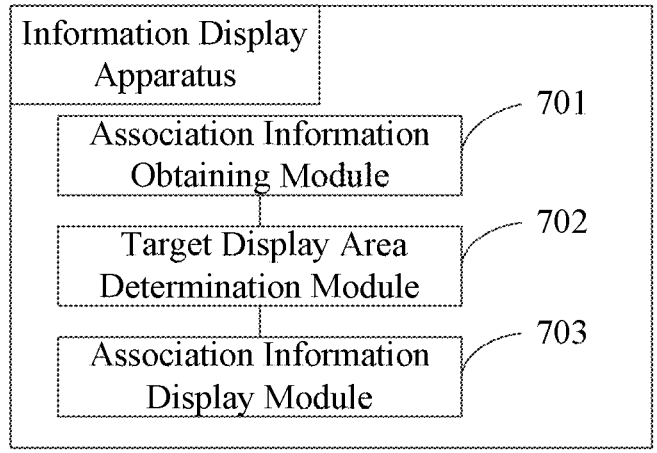
FIG. 7 is a block diagram illustrating an apparatus for information display according to an exemplary embodiment.

FIG. 7 is a block diagram illustrating an apparatus for information display according to an exemplary embodiment of the present disclosure. The apparatus is provided in a see-through near-eye display device, and includes: an association information obtaining module 701, a target display area determination module 702, and an association information display module 703.

The association information obtaining module 701 is configured to obtain association information corresponding to a display object.

The target display area determination module 702 is configured to determine a target display area of the display object within a visual field of the see-through near-eye display device.

The association information display module 703 is configured to display the association information in another area, having no display content, within the visual field excluding the target display area.

As can be seen from the above embodiment, after the association information obtaining module 701 obtains the association information corresponding to the display object, the target display area of the display object within the visual field of the device is determined by the target display area determination module 702, and it is determined by the association information display module 703 that the display position for the association information of the display object is in another area having no display content within the visual field excluding the target display area, enabling the display object and associated information thereof to desirably match the display capability of the device within a limited visual field for normal display, thereby improving the display capability of the device.

Figure 8:
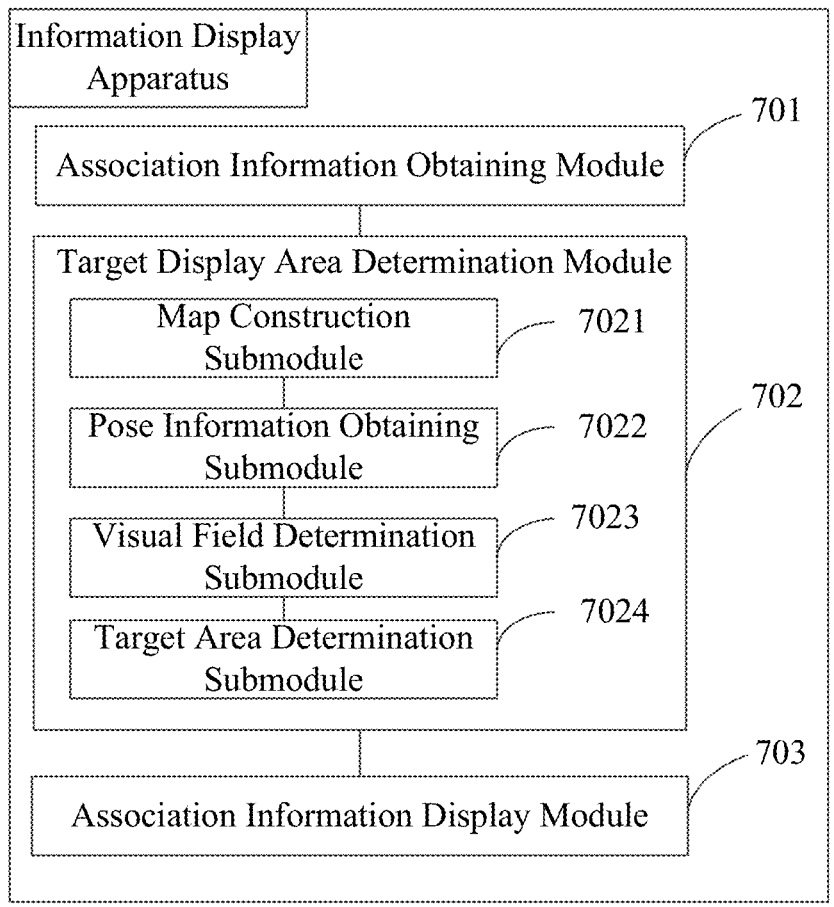
FIG. 8 is a block diagram illustrating an apparatus for information display according to another exemplary embodiment.

FIG. 8 is a block diagram illustrating an apparatus for information display according to another exemplary embodiment of the present disclosure. On the basis of the above embodiment shown in FIG. 7, the target display area determination module 702 includes at least one of the following submodules: a map construction submodule 7021, a pose information obtaining submodule 7022, a visual field determination submodule 7023 and a target area determination submodule 7024.

The map construction submodule 7021 is configured to construct a map of environment in which the see-through near-eye display device is located.

The pose information obtaining submodule 7022 is configured to obtain pose information of the see-through near-eye display device and the display object on the map respectively.

The visual field determination submodule 7023 is configured to determine the visual field of the see-through near-eye display device according to a field angle of the see-through near-eye display device and the pose information of the see-through near-eye display device.

The target area determination submodule 7024 is configured to determine, according to the pose information of the display object, an overlapping area of the display object within the visual field as the target display area of the display object within the visual field of the see-through near-eye display device.

As can be seen from the above embodiment, the target display area determination module 702 can determine, for example by using the SLAM algorithm, the target display area of the display object within the visual field of the device. For example, a map of environment, in which the see-through near-eye display device is located, is constructed firstly by the map construction submodule 7021, then the pose information of the see-through near-eye display device and the display object on the map is obtained by the pose information obtaining submodule 7022 respectively, and the visual field of the see-through near-eye display device is determined by the visual field determination submodule 7023. Finally, the target display area of the display object within the visual field of the see-through near-eye display device is determined by the target area determination submodule 7024 according to the pose information of the display object. The SLAM algorithm may be used to determine the target display area of the display object, which can improve the accuracy of the display object positioning, thereby improving the performance of the see-through near-eye display device.

Figure 9:
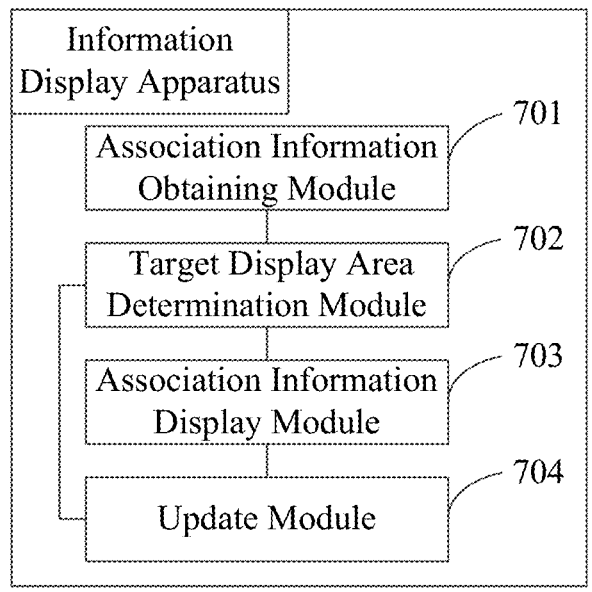
FIG. 9 is a block diagram illustrating an apparatus for information display according to another exemplary embodiment.

FIG. 9 is a block diagram illustrating an apparatus for information display according to another exemplary embodiment of the present disclosure. On the basis of the above embodiment shown in FIG. 7, the apparatus further includes an update module 704.

The update module 704 is configured to update, when a pose of the see-through near-eye display device and/or the display object on the map is changed, the target display area of the display object within the visual field of the see-through near-eye display device, and re-determine a display area of the association information based on the updated target display area.

As can be seen from the above embodiment, the pose change of the device and/or the display object can be detected by the update module 704, and the display position of the association information is adaptively updated based on the above change, always enabling the display of the association information to match the display capability of the device, thereby improving the display capability of the device.

Figure 10:
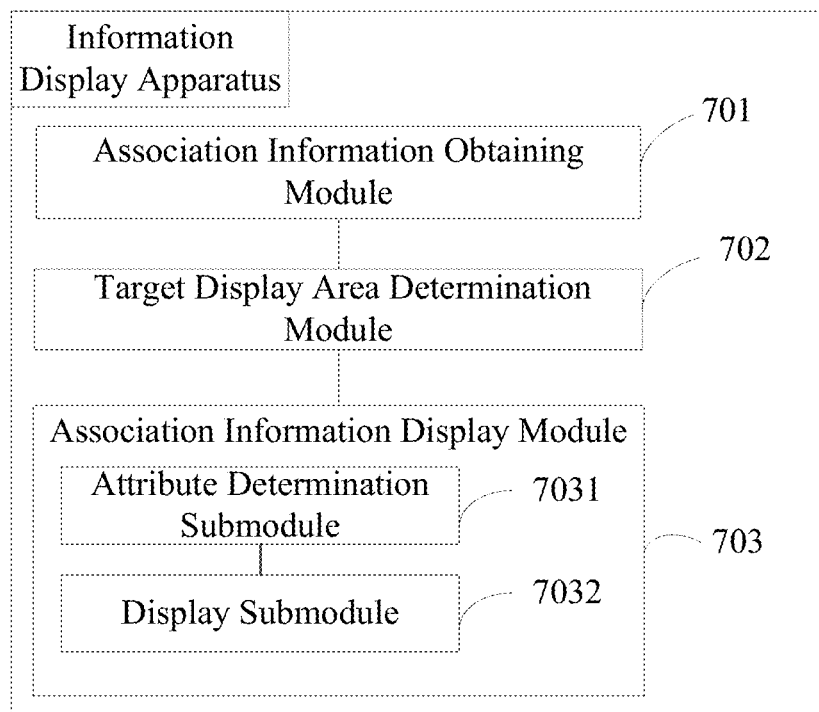
FIG. 10 is a block diagram illustrating an apparatus for information display according to another exemplary embodiment.

FIG. 10 is a block diagram illustrating an apparatus for information display according to another exemplary embodiment of the present disclosure. On the basis of the above embodiment shown in FIG. 7, the association information display module 703 may include at least one of the following submodules: an attribute determination submodule 7031 and a display submodule 7032.

The attribute determination submodule 7031 is configured to determine a display attribute of the association information, the display attribute including a display area size required for the association information.

The display submodule 7032 is configured to select, from areas of the visual field excluding the target display area, the another area fitting the display area size required for the association information for displaying the association information.

As can be seen from the above embodiment, when the association information display is performed, the display attribute, such as the display area size and the like, required for the association information may be firstly determined by the attribute determination submodule 7031, and the area fitting the display area size required for the association information is selected, from the areas of the visual field excluding the target display area, as the display area of the association information, and the association information is displayed in the display area of the association information by the display submodule 7032, thereby ensuring the association information to be displayed completely in the display area of the association information.

In an embodiment, the association information obtaining module 701 is configured to obtain the association information corresponding to the display object, by scanning a two-dimensional code image corresponding to the display object, or from meta information attached to the display object.

As can be seen from the above embodiment, the association information can be provided in the two-dimensional code image or the meta information, so that the device can obtain the association information and improve the acquisition efficiency of the association information.

For the apparatus embodiments, since they basically correspond to the method embodiments, reference may be made to the description of the method embodiments. The apparatus embodiments described above are merely illustrative, wherein the modules described as separate components may be or may not be physically separate, that is, they may be located at one place, or may be distributed at multiple networks. Some or all of the modules may be selected according to actual needs to achieve the objectives of the present disclosure. Those of ordinary skill in the art can understand and implement without any creative effort. Each of the above described modules may be implemented as hardware, or software, or a combination of hardware and software.

Figure 11:
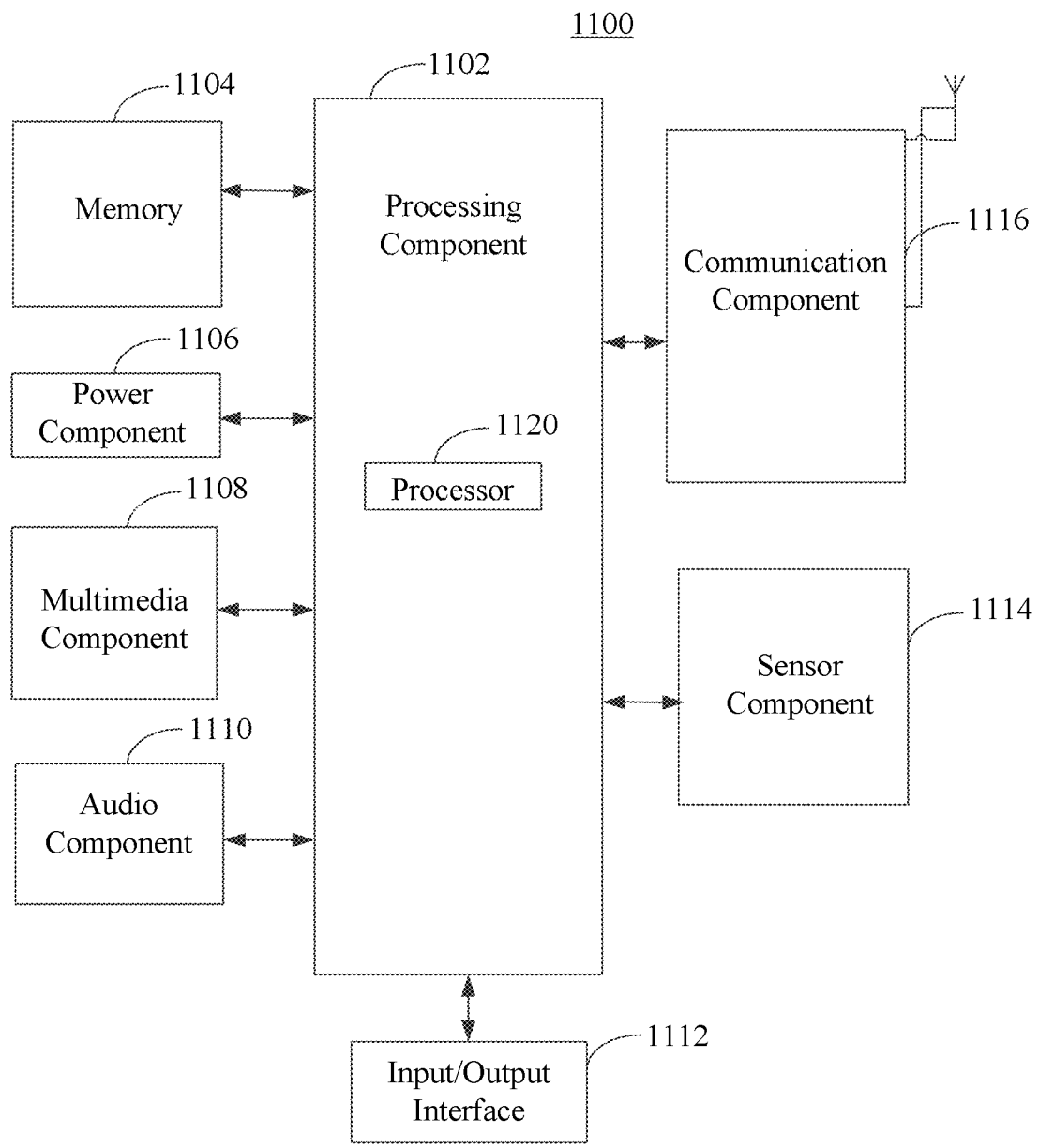
FIG. 11 is a block diagram illustrating a display device according to an exemplary embodiment of the present disclosure.

FIG. 11 is a block diagram illustrating a display device 1100 according to an exemplary embodiment of the present disclosure. The device 1100 may be an AR device, an MR device, or the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, data communications, camera operations, and recording operations. The processing component 1102 may include one or more processors 1120 to execute instructions for performing all or part of steps in the forgoing method. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a back camera. The camera may receive an external multimedia datum while the device 1100 is in an operation mode, such as a photographing mode or a video mode. Each of the cameras may be a fixed optical lens system or have focus and optical zoom capability.

The audio component 1110 is configured to output and/or input audio signals. For example, the audio component 1110 includes a microphone ('MIC') configured to receive an external audio signal when the device 1100 is in an operation mode, such as a recording mode and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For example, the sensor component 1114 may detect an open/closed status of the device 1100, relative positioning of components, e.g., the display of the device 1100. The sensor component 1114 may also detect a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 4G, or 5G, or a combination thereof. In one exemplary embodiment, the communication component 1116 receives a broadcast signal from an external broadcast management system or broadcasts associated information via a broadcast channel. In one exemplary embodiment, the communication component 1116 further includes a near field communication (NFC) module to facilitate short-range communications. In one exemplary embodiment, the communication component 1116 may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform above methods.

In exemplary embodiments, there is also provided a non-transitory computer-readable storage medium, such as the memory 1104 including instructions. The instructions are executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

The instructions in the storage medium, when executed by the processor, causes the device 1100 to perform a method for information display, including: obtaining association information corresponding to a display object; determining a target display area of the display object within a visual field of the see-through near-eye display device; and displaying the association information in another area, having no display content, within the visual field excluding the target display area.

Other embodiments of the disclosure will be apparent to those skilled in the art from consideration of the specification and practice of the disclosure disclosed here. This specification is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for information display, applied to a see-through near-eye display device, the method comprising:
 obtaining association information corresponding to a display object;

determining a target display area of the display object within a visual field of the see-through near-eye display device; and displaying the association information in a second area within the visual field excluding the target display area, the second area having no display content, wherein the displaying the association information in a second area within the visual field excluding the target display area comprises:

determining a display attribute of the association information, the display attribute comprising a display area size required for the association information; and selecting, from areas of the visual field excluding the target display area, the second area fitting the display area size required for the association information to display the association information.

2. The method according to claim 1, wherein the determining a target display area of the display object within a visual field of the see-through near-eye display device comprises:

constructing a map of environment in which the see-through near-eye display device is located;

obtaining pose information of the see-through near-eye display device and the display object on the map respectively;

determining the visual field of the see-through near-eye display device according to a field angle of the see-through near-eye display device and the pose information of the see-through near-eye display device; and determining, according to the pose information of the display object, an overlapping area of the display object within the visual field as the target display area of the display object within the visual field of the see-through near-eye display device.

3. The method according to claim 2, further comprising:

updating, when at least one of a pose of the see-through near-eye display device or the display object on the map is changed, the target display area of the display object within the visual field of the see-through near-eye display device, and determining a display area of the association information based on the updated target display area.

4. The method according to claim 1, wherein the obtaining association information corresponding to a display object comprises:

obtaining the association information corresponding to the display object by scanning a two-dimensional code image corresponding to the display object, or from meta information attached with the display object.

5. A display device, comprising:

a processor; and a memory for storing instructions executable by the processor;

wherein, the processor is configured to:

obtain association information corresponding to a display object;

determine a target display area of the display object within a visual field of the display device; and display the association information in a second area within the visual field excluding the target display area, the second area having no display content, wherein in displaying the association information in a second area within the visual field excluding the target display area, the processor is further configured to:

determine a display attribute of the association information, the display attribute comprising a display area size required for the association information; and select, from areas of the visual field excluding the target display area, the second area fitting the display area size required for the association information to display the association information.

6. The display device according to claim 5, wherein in determining a target display area of the display object within a visual field of the display device, the processor is further configured to:

construct a map of environment in which the display device is located;

obtain pose information of the display device and the display object on the map respectively;

determine the visual field of the display device according to a field angle of the display device and the pose information of the display device; and determine, according to the pose information of the display object, an overlapping area of the display object within the visual field as the target display area of the display object within the visual field of the display device.

7. The display device according to claim 6, wherein the processor is further configured to:

update, when at least one of a pose of the display device or the display object on the map is changed, the target display area of the display object within the visual field of the display device, and determine a display area of the association information based on the updated target display area.

8. The display device according to claim 5, wherein the processor is configured to obtain the association information corresponding to the display object by scanning a two-dimensional code image corresponding to the display object, or from meta information attached with the display object.

9. A non-transitory computer-readable storage medium having stored thereon instructions that, when executed by a processor of a see-through near-eye display device, cause the see-through near-eye display device to perform a method for information display, the method comprising:

obtaining association information corresponding to a display object;

determining a target display area of the display object within a visual field of the see-through near-eye display device; and displaying the association information in a second area within the visual field excluding the target display area, the second area having no display content, wherein the displaying the association information in a second area within the visual field excluding the target display area comprises:

determining a display attribute of the association information, the display attribute comprising a display area size required for the association information; and selecting, from areas of the visual field excluding the target display area, the second area fitting the display area size required for the association information to display the association information.

* * * * *